J. W. CHILDS.

SCHOOL-DESK.

No. 7,132. Reissued May 23, 1876.

Witnesses:
Frank Brown
R. M. Clark

Inventor:
J. Wallace Childs

N. PETERS, PHOTO-LITHOGRAPHER, WASHINGTON, D. C.

UNITED STATES PATENT OFFICE.

J. WALLACE CHILDS, OF KANSAS CITY, MISSOURI.

IMPROVEMENT IN SCHOOL-DESKS.

Specification forming part of Letters Patent No. 174,480, dated March 7, 1876; reissue No. 7,132, dated May 23, 1876; application filed April 15, 1876.

*To all whom it may concern:*

Be it known that I, J. WALLACE CHILDS, of Kansas City, in the county of Jackson and State of Missouri, have invented a new and valuable Improvement in School-Desks, which improvement is fully set forth in the following specification, reference being had to the accompanying drawings.

Figure 1:
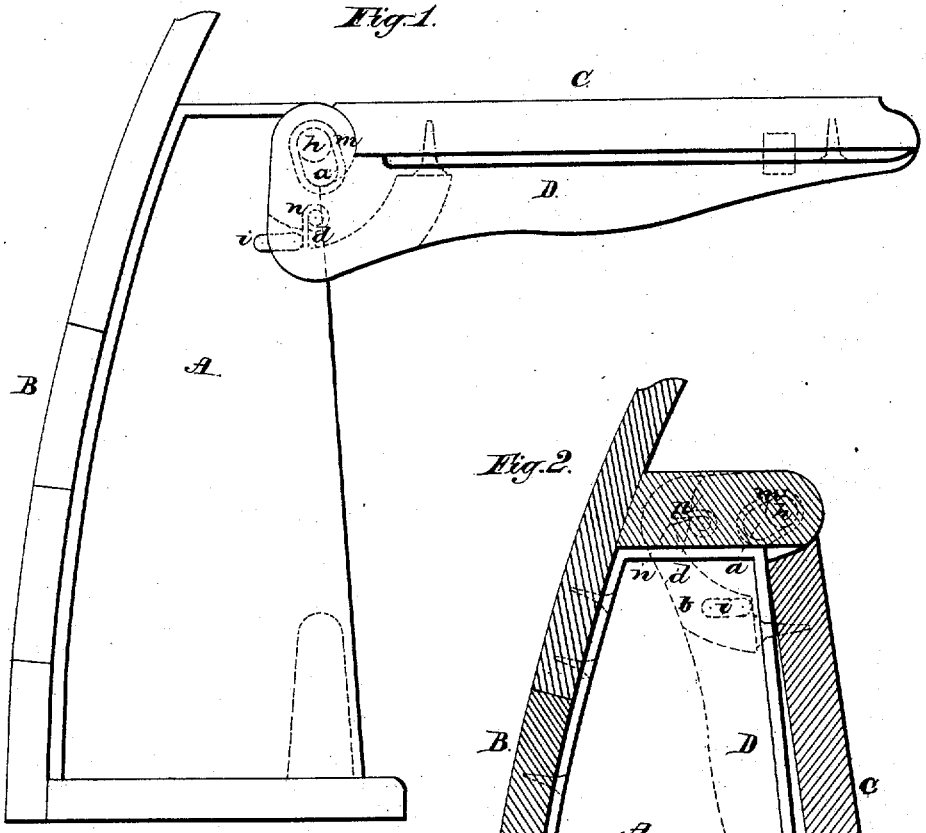
Figure 2:
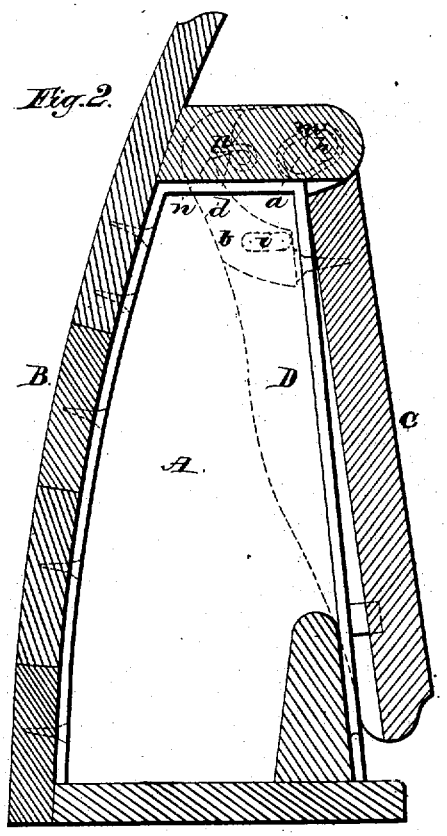

Figure 1 of the drawings is a representation of a side view of my school-desk, and Fig. 2 is a transverse vertical sectional view thereof.

My invention relates to that class of school-desks having movable arms, which are attached to the top of the standards in such a manner as to permit the desk-top being folded down against the back.

The object of my invention is to construct a desk-top arm with recesses or covered slots and a shoulder, in combination with a pintle and stop, so that the desk-top can be easily adjusted to the horizontal or perpendicular positions, as shown in the drawings; also, in providing cushions on the arms or standards, preventing noise in operating the desk-top, as will be hereinafter more fully described.

In the drawing, A A represent the metallic standards, spaced and held apart by intermediate pieces, and connected with the back B. C is the desk top or lid; but none of these form any part of my invention. D is the desk-top arm, attached to the lid C, and preferably made of metal, having the covered slots or recesses *a* and *b*, and also the shoulders *d* being formed therein. The recess *a* is elongated, in order to allow the top to be lifted, while the recess *b* is arc-shaped.

On each standard A is a projecting pintle, *h*, to enter the recess *a*, on which the arm D turns, and also a projecting stop, *i*, to work in the recess *b*. At one end of the recess *b* is formed a shoulder, *d*, which is held by the gravity of the desk-top C against the stop *i*, as shown in Fig. 1. Thus held, the desk-top C is ready to receive the books of the scholar, and when it is desired to turn down the lid it is lifted until the shoulder *d* passes the stop *i*. This allows the arm D to be turned on the pintle *h*, and the desk-top C folded against the back, as shown in Fig. 2.

Ordinarily, in this class of school-desks, the slots for the pintle and stop are cut entirely through the arm, which often causes the person operating the desk-top to get the fingers caught therein, also weakening it thereby. This is entirely obviated by covering these slots on the outside, or, in other words, so constructing the arm that the slots are not cut entirely through, but simply recesses formed on the inner side, which also makes the arm present a neat appearance.

In the recess *a* around the pintle *h* is inserted a cushion, *m*. In the arm at the shoulder *d* is formed a recess, in which the circular end of a cushion, *n*, is inserted and permanently secured. The other end of the cushion projects over the shoulder *d* and bears on the stop *i*.

The noise occasioned in either raising or lowering the lid is entirely overcome by providing the parts, where the lid-arms come in contact with the standards, with metallic or non-metallic cushions, substantially as described and shown.

What I claim as new, and desire to secure by Letters Patent, is—

1. A desk-top arm constructed with a covered elongated slot, *a*, and a covered curved slot or recess, *b*, substantially as and for the purpose set forth.

2. The desk-top arm D, formed with covered slots or recesses *a b* and shoulder *d*, in combination with the pintle *h* and stop *i*, substantially as and for the purpose set forth.

3. The cushion *m*, inserted in the recess *a* around the pintle *h*, substantially as and for the purpose set forth.

4. The cushion *n*, inserted in a recess in the arm D, and projecting over the shoulder *d*, substantially as and for the purpose set forth.

J. WALLACE CHILDS.

Witnesses:

PHILANDER LUCAS,

JAMES A. PEEPLES.